(12) United States Patent
Murata

(10) Patent No.: US 7,440,089 B2
(45) Date of Patent: Oct. 21, 2008

(54) METHOD OF MEASURING DECENTERING OF LENS

(75) Inventor: Yasunori Murata, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/378,699

(22) Filed: Mar. 17, 2006

(65) Prior Publication Data
US 2006/0209294 A1 Sep. 21, 2006

(30) Foreign Application Priority Data
Mar. 18, 2005 (JP) ............... 2005-079725

(51) Int. Cl.
*G01B 9/00* (2006.01)
(52) U.S. Cl. ............... 356/127; 356/124.5; 356/124
(58) Field of Classification Search ............... 356/124, 356/124.5, 125–127; 250/223 B, 223 R, 250/559.01; 382/141–142
See application file for complete search history.

(56) References Cited

U.S. PATENT DOCUMENTS

| | | | | |
|---|---|---|---|---|
| 3,988,068 | A | * | 10/1976 | Sprague ............... 356/124 |
| 5,059,022 | A | * | 10/1991 | Ookawa ............... 356/124 |
| 5,335,244 | A | * | 8/1994 | Dugan et al. ............... 372/101 |
| 5,351,119 | A | * | 9/1994 | Nakatsue ............... 356/124 |
| 5,500,732 | A | * | 3/1996 | Ebel et al. ............... 356/124 |
| 5,627,638 | A | * | 5/1997 | Vokhmin ............... 356/124 |
| 5,717,781 | A | * | 2/1998 | Ebel et al. ............... 382/141 |
| 5,999,251 | A | * | 12/1999 | Teramoto et al. ............... 356/127 |

FOREIGN PATENT DOCUMENTS

| JP | 03115944 | A * | 5/1991 |
|---|---|---|---|
| JP | 7-229811 | | 8/1995 |
| JP | 8-12126 | | 2/1996 |
| JP | 2735104 | | 1/1998 |
| JP | 2735106 | | 1/1998 |

OTHER PUBLICATIONS

Technology of Making Optical Elements '79, Japan Optical Engineering Research Association, English translation provided.

* cited by examiner

*Primary Examiner*—Sang Nguyen
(74) *Attorney, Agent, or Firm*—Morgan & Finnegan, LLP

(57) ABSTRACT

Disclosed is a measuring method which can measure the decentering of an axis by the measurement of a two-dimensional curved surface profile. This method has a first step of measuring a profile of a examined surface by a probe from a first reference position which is a position separate by a predetermined amount from a predetermined position on the examined surface of a subject lens, a second step of measuring the profile of the examined surface by scanning the examined surface by the probe from the second reference position which is a position separate by a predetermined amount from said predetermined position in a route opposite to the scanning direction of said first step after a rotation of the subject lens; and the step of obtaining the decentering amount of the examined surface by the use of the measurement results obtained at the first and second steps.

6 Claims, 16 Drawing Sheets

BASED ON SCANNING MEASUREMENT DATA FROM DIRECTIONS 1 AND 5

ASPHERICAL SURFACE AXIS SHIFT AMOUNT $\Delta S$ = (1Xt−5Xt)/2
= (2.6896−2.6955)/2
= −0.003mm ASPHERICAL SURFACE AXIS TILT AMOUNT $\Delta T$ = (1 TILT−5 TILT)/2
= (0.0999−0.0026)/2
= 0.049deg

BASED ON SCANNING MEASUREMENT DATA FROM DIRECTIONS 3 AND 7

ASPHERICAL SURFACE AXIS SHIFT AMOUNT = (3Xt−7Xt)/2
= (2.6658−2.7217)/2
= −0.028mm

ASPHERICAL SURFACE AXIS TILT AMOUNT = (3 TILT−7 TILT)/2
= (0.4154−(−0.3706))/2
= 0.393deg

BASED ON SCANNING MEASUREMENT DATA FROM DIRECTIONS 2 AND 6

ASPHERICAL SURFACE AXIS SHIFT AMOUNT = (2Xt−6Xt)/2
= (2.6713−2.7178)/2
= −0.023mm

ASPHERICAL SURFACE AXIS TILT AMOUNT = (2 TILT−6 TILT)/2
= (0.3451−(−0.2924))/2
= 0.319deg

BASED ON SCANNING MEASUREMENT DATA FROM DIRECTIONS 4 AND 8

ASPHERICAL SURFACE AXIS SHIFT AMOUNT = (4Xt−8Xt)/2
= (2.6772−2.7137)/2
= −0.018mm

ASPHERICAL SURFACE AXIS TILT AMOUNT = (4 TILT−8 TILT)/2
= (0.3050−(−0.2589))/2
= 0.282deg

METHOD OF MEASURING DECENTERING OF LENS

BACKGROUND OF THE INVENTION

1. Field of the Invention

This invention relates to a method of measuring the decentering of a lens which is suitable for measuring the decentering amount of a curved surface, for example, the decentering amount of a spherical surface or an aspherical surface.

2. Related Background Art

In recent years, in various optical systems for use in digital cameras, video cameras, etc., aspherical lenses are often adopted for an improvement in optical performance and the downsizing of the optical systems.

Along with this, a method of accurately measuring the decentering amount of the optical axis (aspherical surface axis) of the aspherical lens is required.

As a method of measuring the decentering amount of the aspherical surface axis of the aspherical lens, there is known a method of measuring the profile data of an aspherical lens by the use of a three-dimensional position measuring apparatus (Japanese Patent Application Laid-open No. H07-229811).

According to the method disclosed in Japanese Patent Application Laid-open No. H07-229811, the decentering of an aspherical surface axis with the position of a lens holding member as the reference can be highly accurately measured without the lens holding member being rotated. It is also possible to measure the decentering of the aspherical surface axis relative to the outer diameter of a lens by three-dimensionally measuring the outer diameter portion of the lens. This method, however, requires a complicated three-dimensional position measuring apparatus. Also, as compared with two-dimensional profile measurement, the method includes a disadvantage that much time is required for measurement and data processing because enormous data is used.

At present, as a typical aspherical surface profile measuring apparatus, there is known Form Talysurf produced by TAYLOR-HOBSON LIMITED. Form Talysurf announced in 1984 is a two-dimensional profile measuring apparatus given the function of measuring a surface profile to a contact type surface roughness measuring apparatus.

The two-dimensional aspherical surface profile measuring apparatus calculates and evaluates the error amount between the cross-sectional shape of the design reference aspherical surface of a subject lens to be measured and the actually measured cross-sectional shape of the aspherical surface.

If the coordinate axis of the optical axis of the design reference aspherical surface profile and the coordinate axis of the optical axis of the actually measured aspherical surface profile coincide with each other, a simple difference is an aspherical surface shape error.

In an ordinary case, however, due to the existence of the decentering component of the subject lens, the positional error, the inclination error, or the like when the subject lens is held on the measuring apparatus, the coordinate axis of the optical axis of the actually measured aspherical surface profile does not coincide with the coordinate axis of the optical axis of the design reference aspherical surface shape.

So, generally, the aspherical surface profile measuring apparatus converts the coordinates on the basis of aspherical surface axis data searched for (calculated) from actually measured aspherical surface data so that the optical axis of the actually measured aspherical surface may coincide with the optical axis of the design reference aspherical surface, and calculates the error amount of the aspherical surface.

Heretofore, the searched for data of the position and inclination of the aspherical surface axis in a measurement scanning direction has been calculated from the actually measured profile of the subject lens. However, the decentering amount of the aspherical surface axis relative to the outer diameter of the subject lens could not be detected.

To measure the decentering amount of the aspherical surface axis relative to the outer diameter of the lens, the outer diameter portion of the lens and the profile of an aspherical surface lens should be measured at a time. However, in the conventional two-dimensional profile measuring method, it has been difficult to measure the outer diameter position of the lens simultaneously with the measurement of the aspherical surface profile.

SUMMARY OF THE INVENTION

The present invention has as its object to provide a method of measuring the decentering of a lens which can measure the decentering of a curved surface axis from the measurement of a two-dimensional curved surface profile.

An illustrative method of measuring the decentering of a lens according to the present invention has:

a first step of measuring a profile of an examined surface by scanning the examined surface by a probe from a first reference position which is a position separate by a predetermined amount from a predetermined position on the examined surface of a subject lens;

a second step of measuring the profile of the examined surface by scanning the examined surface by the probe from the second reference position which is a position separate by a predetermined amount from the predetermined position in a route opposite to the scanning direction of the first step after a rotation of the subject lens; and the step of obtaining the decentering amount of the examined surface by the use of the measurement results obtained at the first and second steps.

DESCRIPTION OF THE PREFERRED EMBODIMENTS

Embodiment 1

Figure 1:
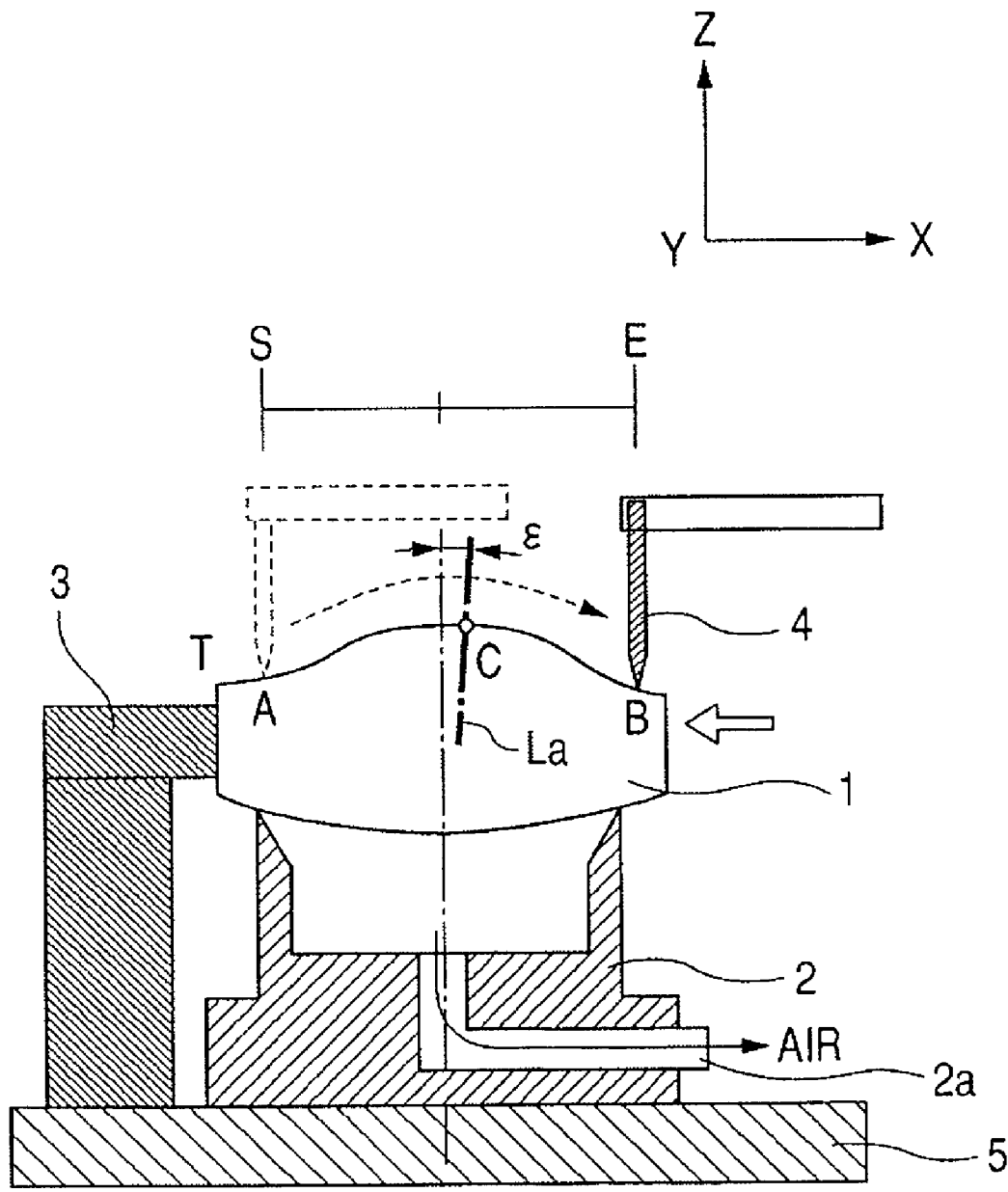
FIG. 1 is a cross-sectional view showing the first measuring state in Embodiment 1.
Figure 5:
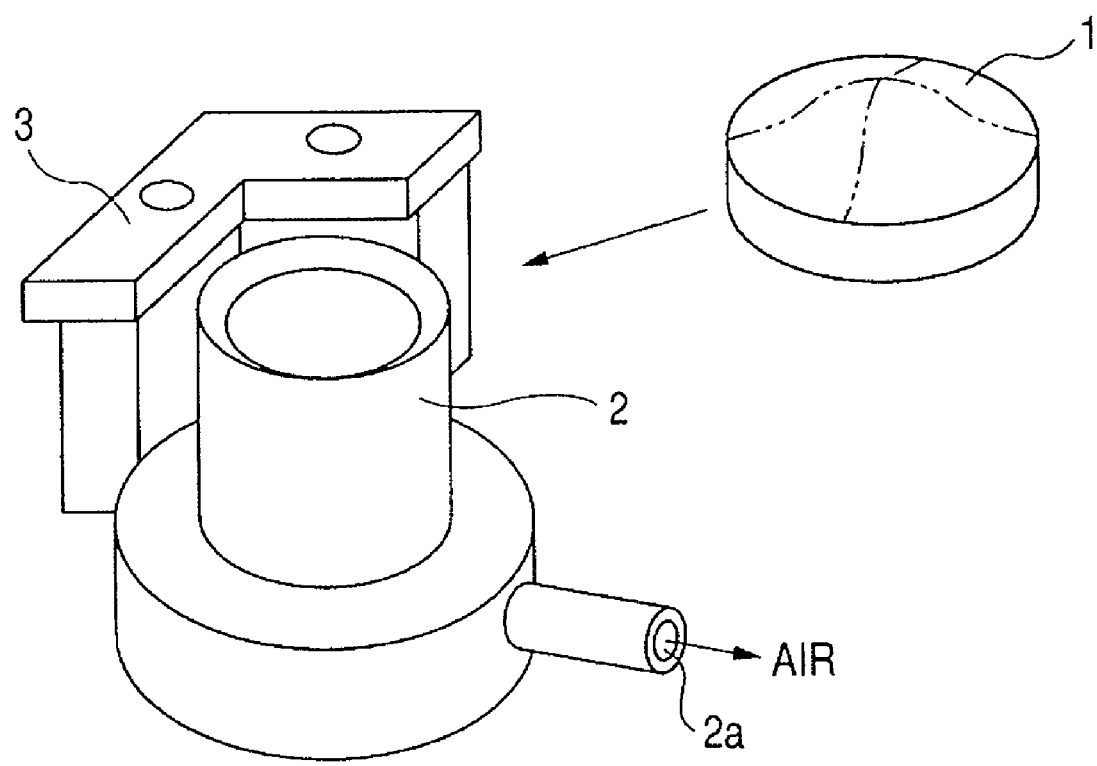
FIG. 5 is a perspective view of a lens holding member according to Embodiment 1.

FIG. 1 is a schematic cross-sectional view of Embodiment 1 of the decentering measuring apparatus of the present invention. FIG. 5 is a perspective view of the essential portions of FIG. 1.

In FIG. 1, the reference numeral 1 designates a subject lens comprising a spherical lens or an aspherical lens. The reference numeral 2 denotes a receiving jig (lens holding member) for positioning of the subject lens 1 in the direction of the optical axis thereof. The reference numeral 3 designates a positioning jig for positioning of the subject lens 1 in directions perpendicular to the optical axis thereof (directions X and Y in FIG. 1). The reference numeral 4 denotes a probe (scanning member) for scanning on the surface of the subject lens 1 and measuring the surface profile thereof.

In FIG. 1, X-axis is defined as the coordinate system in the left to right direction in the plane of the drawing sheet, Y-axis is defined as the direction from this side to the inner part in the plane of the drawing sheet (a direction perpendicular to the plane of the drawing sheet), and Z-axis is defined as the vertical direction in the plane of the drawing sheet.

In FIG. 5, in a state in which the subject lens 1 is placed on the cylindrical receiving jig 2 and is abutted to the positioning jig 3, the air is evacuated through a through-hole 2a in the receiving jig 2 to thereby reduce the internal pressure, and the subject lens 1 is adsorbed and fixed to the receiving jig 2.

The positioning jig 3 is such an L-shaped member as shown in FIG. 5. The positioning jig 3 is set so that two locations on the outer peripheral portion of the subject lens 1 may abut to it, and positions the subject lens 1 in the directions X and Y.

While in Embodiment 1, description is made of an embodiment of the subject lens 1 of which the outer diameter is circular, measurement is likewise possible in the case of a subject lens of which the outer diameter is of other shape, e.g. a rectangular shape.

The receiving jig 2 and the positioning jig 3 are fixed on a stage 5.

The stage 5 has a four-axis adjusting mechanism (not shown).

In the present embodiment, the stage 5 has a two-axis horizontal moving mechanism which effects linear movement along the X-axis and the Y-axis, and a two-axis angle adjusting mechanism which effects rotational movement about the X-axis and the Y-axis.

Description will now be made of the decentering measuring procedure in Embodiment 1. While in Embodiment 1, description is made with an aspherical lens taken as an example of the subject lens, the subject lens may be a spherical lens.

First, the measuring jigs are set before measurement.

Before the receiving jig 2 and the positioning jig 3 are fixed on the stage 5, the stage 5 is horizontally positioned relative to the decentering measuring apparatus. Specifically, the probe 4 is brought into contact with the stage 5, and scanning measurement is performed in the direction of the X-axis to thereby adjust the angle stage so that the surface profile may become horizontal. Next, the stage 5 is horizontally moved in the direction of the Y-axis to thereby adjust the angle so that the height of the probe 4 may not change.

Next, the lens receiving jig 2 and the positioning jig 3 are installed on the stage 5.

First, the lens receiving jig 2 is fixed, and then the subject lens 1 is placed on the receiving jig 2.

The positioning jig 3 is abutted to the outer peripheral portion (edge surface) of the subject lens 1, and the positioning jig 3 is fixed with the center of the subject lens 1 and the center of the receiving jig 2 being coincident with each other.

Then, the air is evacuated through the through-hole 2a, and the subject lens 1 is fixed to the receiving jig 2.

The position of the stage 5 is adjusted so that the probe 4 which scans and measure the aspherical surface shape of the subject lens 1 may pass the center of the outer diameter of the subject lens 1.

A method of measuring the decentering of the aspherical surface axis relative to the outer diameter of the lens will now be described with reference to a flow chart shown in FIG. 20.

The first measurement of the aspherical surface profile is performed in the state shown in FIG. 1 (step S101). The measurement is performed by the probe 4 scanning and measuring a measurement starting point S to a measurement ending point E within the aspherical surface profile guarantee range (within the effective diameter) of the examined surface in the direction X.

Figure 2:
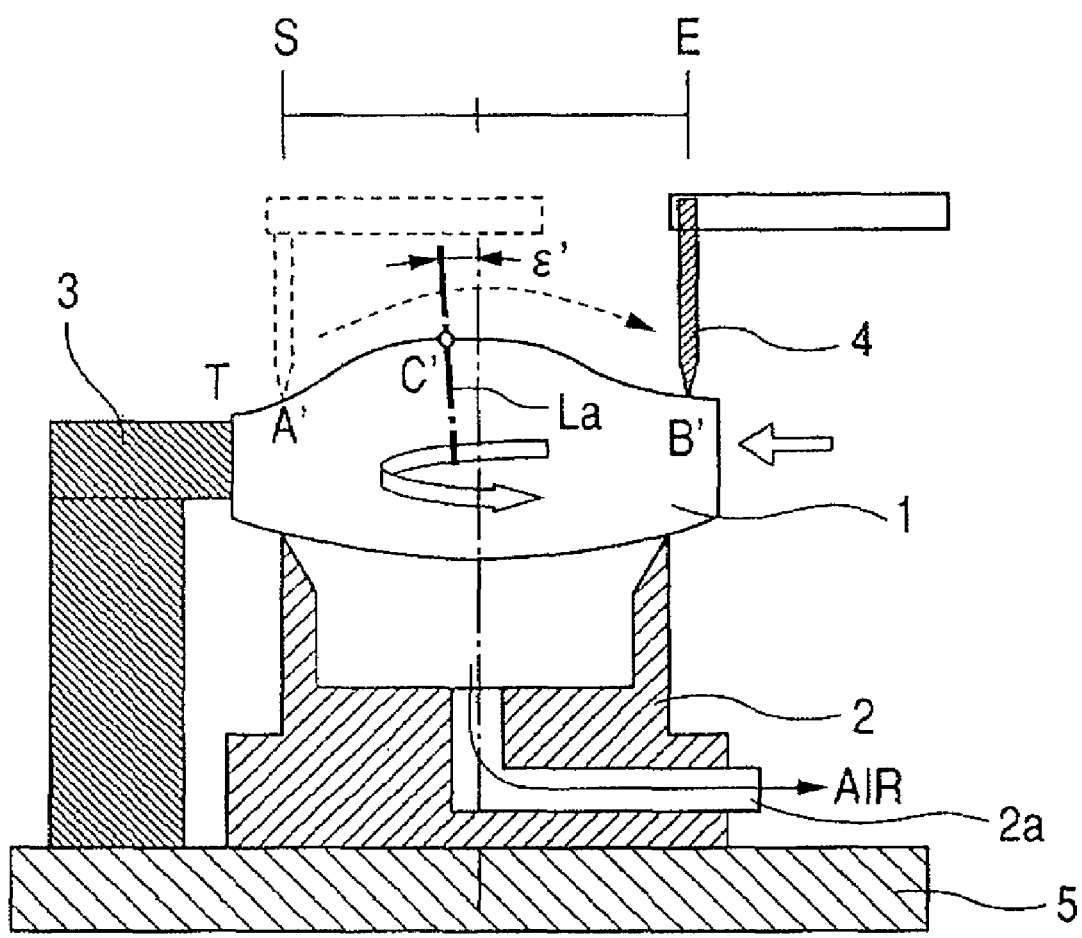
FIG. 2 is a cross-sectional view showing the second measuring state in Embodiment 1.

Next, only the subject lens 1 is rotated by 180 degrees with the lens receiving jig 2 and the positioning jig 3 remaining fixed, to thereby hold and fix the subject lens 1 in a state shown in FIG. 2 (step S102). Subsequently, the second measurement is performed (step S103). The probe 4, as in the first measurement, scans the measurement starting point S to the measurement ending point E in the direction X to thereby scan and measure the aspherical profile. In the second measurement, measurement is performed with the subject lens 1 rotated by 180 degrees relative to the first measurement and thus, the examined surface is measured in a route opposite to the scanning direction in the first measurement.

Next, the information of the decentering of an aspherical surface axis La relative to the outer diameter of the lens is calculated from the data of the first and second measurements (step S104).

The decentering information of the aspherical surface axis La in a certain cross section can be obtained by the step S101 to the step S104. When it is necessary to obtain the decentering information in other cross section (step S105), the subject lens 1 is further rotated (S106) to thereby repeat the profile measurement and the calculation of the decentering information in the other cross section.

Generally, the decentering direction of the aspherical surface axis La does not always coincide with the first measurement cross section and therefore, profile measurement should preferably be performed in at least two cross sections. If for example, profile measurement in a certain cross section and profile measurement in a cross section orthogonal to that cross section are performed, the decentering amount of the aspherical surface axis La can be grasped accurately.

Figure 20:
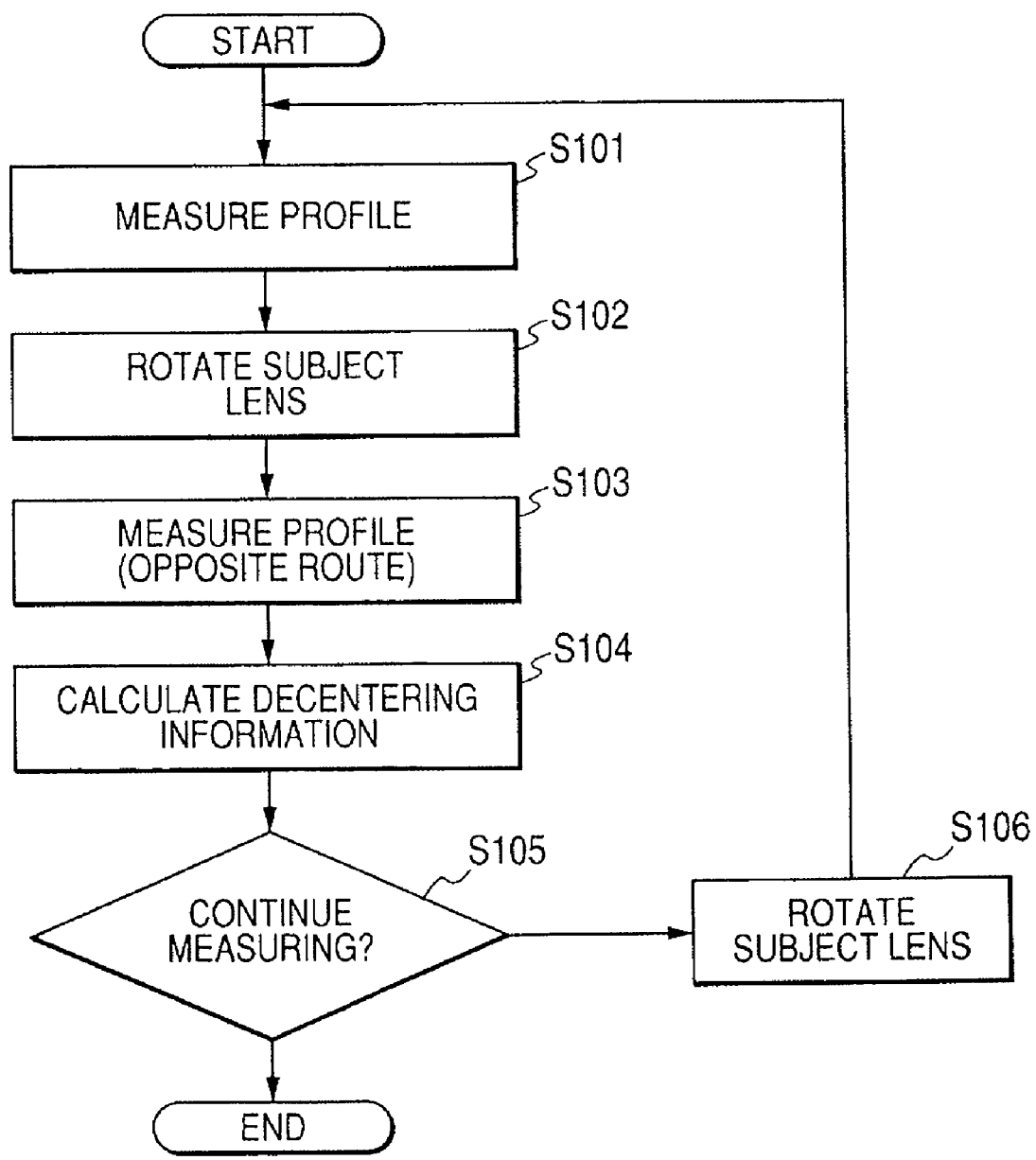
FIG. 20 is a flow chart of a method of measuring the decentering of an aspherical surface axis.

While in FIG. 20, the necessity of measurement in a different cross section (step S105) is judged after the decentering information of a cross section has been calculated (step S104), the step S105 may precede the step S104. That is, after a plurality of cross sections has been measured, the decentering information may be collectively calculated (step S104).

Description will hereinafter be made of a method of calculating the decentering information which is carried out at the step S104.

Figure 19A:
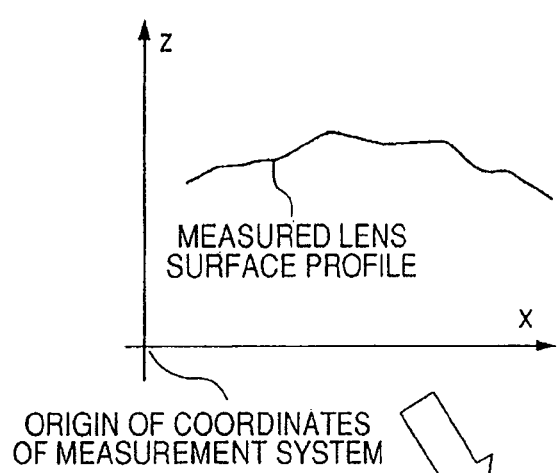
FIGS. 19A, 19B and 19C are illustrations of the way to find the decentering amount of a lens surface in Embodiment 1.

FIG. 19A shows the lens surface profile scanned and measured by the probe 4 with a predetermined point on the examined surface as the reference of the origin of measurement coordinates.

The axis of abscissas represents the scanning direction (the direction X), and the axis of ordinates represents a direction Z representative of the profile.

Figure 19B:
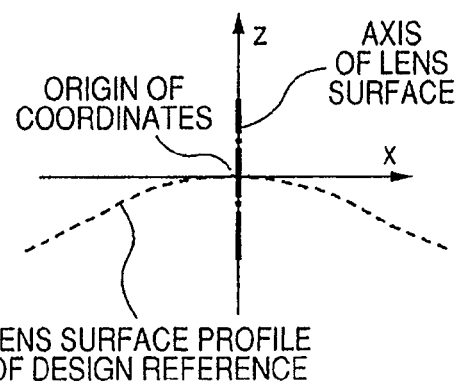

FIG. 19B shows an ideal lens profile (the profile of the design value of the examined lens surface) in the coordinates of the design reference.

In the present embodiment, by the raw data of the actually measured lens profile of FIG. 19A, it is impossible to find the axis and profile error of the actually measured lens surface profile.

Figure 19C:
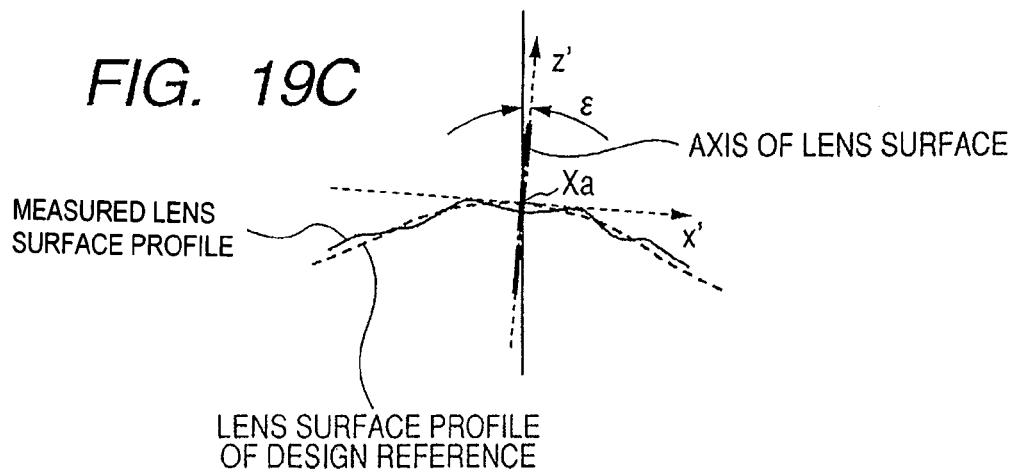

So, as shown in FIG. 19C, coordinates conversion (fitting) is effected so that the error between the raw data of the actually measured lens profile of FIG. 19A and the ideal set standard lens profile of FIG. 19B may be minimum.

Figure 3:
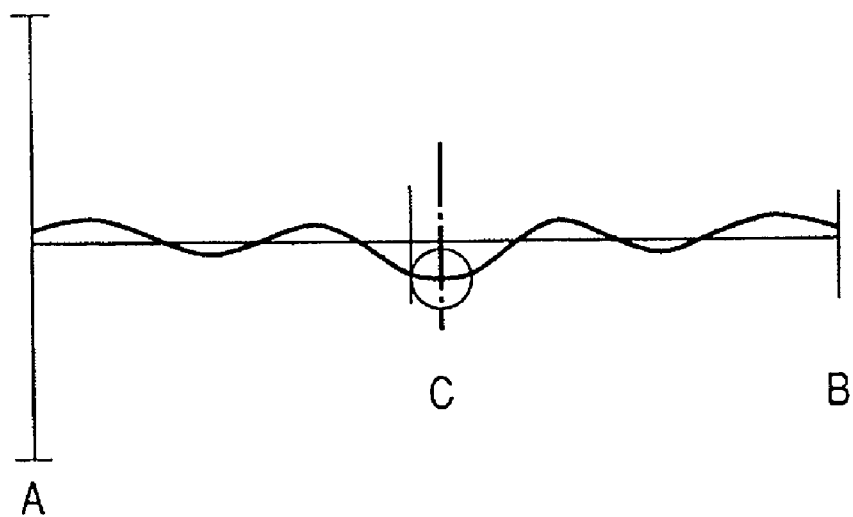
FIG. 3 shows the result of the first aspherical surface profile measurement in Embodiment 1.
Figure 4:
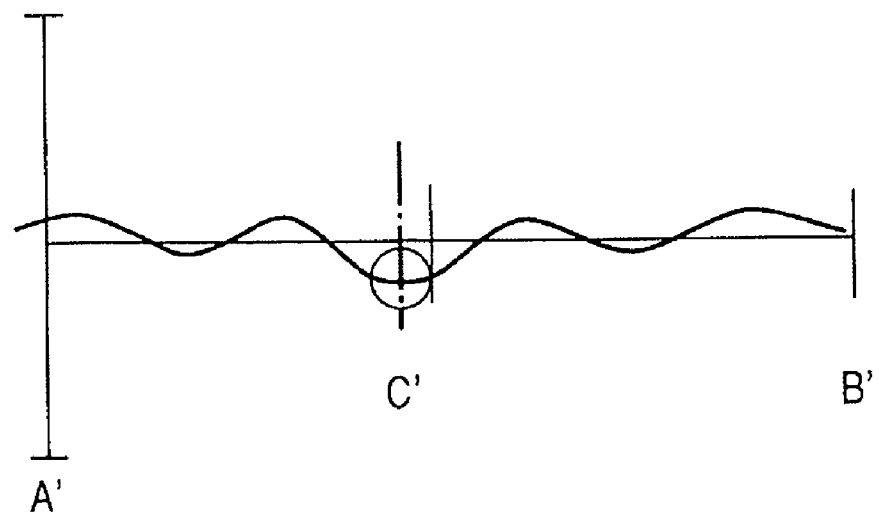
FIG. 4 shows the result of the second aspherical surface profile measurement in Embodiment 1.

FIGS. 3 and 4 show the result of the calculation of the difference between the profile of the design reference lens surface and the profile of the actually measured lens surface in the state of FIG. 19C.

FIG. 3 shows the result of the first measurement of the aspherical surface profile error, and FIG. 4 shows the result of the second measurement of the aspherical surface profile error.

The tilt amount $\epsilon$ of the lens surface axis La of the actually measured lens surface profile in the measurement coordinate system is a value searched for at the step of making the actually measured lens surface profile and the design reference lens surface profile coincident with each other. FIGS. 3 and 4 show the profile error amount in new X'Z' coordinate system wherein the tilt amounts $\epsilon$ and $\epsilon'$ have been corrected.

Positions C and C' and the tilt amounts $\epsilon$ and $\epsilon'$ are obtained by a calculation using the actually measured aspherical surface profile (measurement data) and the design reference aspherical surface profile (design data). That is, the position and tilt of such an optimum aspherical surface axis La of the actually measured aspherical surface profile that the error between the measurement data and the design data becomes minimum as previously described (i.e., the tilt amount when the measurement data and the design data have been subjected to fitting) are searched for, and the values thereof are obtained as the positions C and C' and the tilt amounts $\epsilon$ and $\epsilon'$.

In the first and the second aspherical surface profile measurement, the cross-sectional shapes from the measurement starting point S to the measurement ending point E which is the same measurement ranges within the aspherical surface profile guarantee range of the subject lens 1 are measured. Then, the position C of the optimum aspherical surface axis La in the first measurement and the second position C' thereof in the second measurement are calculated from the aspherical surface axis of each area by a calculation.

The distance AC from the first measurement starting point A to the position C of the optimum aspherical surface axis and the distance A'C' from the second measurement starting point A' to the position C' of the optimum aspherical surface axis are found by a calculation.

If the distances from the outer diameter portion (predetermined position) T of the lens to the point C and the point C' are unknown, the decentering amount of the optimum aspherical surface axis with the outer diameter of the lens as the reference cannot be obtained.

However, since the first and second measurements are performed from one and the same measurement starting point S, the distance (predetermined amount) TA from the point T (predetermined position) of the first measurement to the point A (reference position) and the distance (predetermined amount) TA' from the point T of the second measurement to the point A' (reference position) are the same.

In FIG. 1, the distance TC=the distance TA+the distance AC, and in FIG. 2, the distance TC'=the distance TA'+the distance A'C'.

The decentering amount $\Delta$ of the position of the optimum aspherical surface axis La relative to the center of the outer diameter of the lens=(the distance TC−the distance TC')/2, however from the relation that the distance TA=the distance TA', it can be obtained by the decentering amount $\Delta$ of the position of the optimum aspherical surface axis La relative to the outer diameter of the lens=(the distance AC−the distance A'C')/2.

The tilt decentering amount $\Delta\epsilon$ of the optimum aspherical surface axis La, when the tilt amount measured at the first time is defined as $\epsilon$ and the tilt amount measured at the second time is defined as $\epsilon'$, can be found by the tilt decentering amount $\Delta\epsilon=(\epsilon-\epsilon')/2$ relative to the lens surface received by the lens holding member 2.

Figure 13:
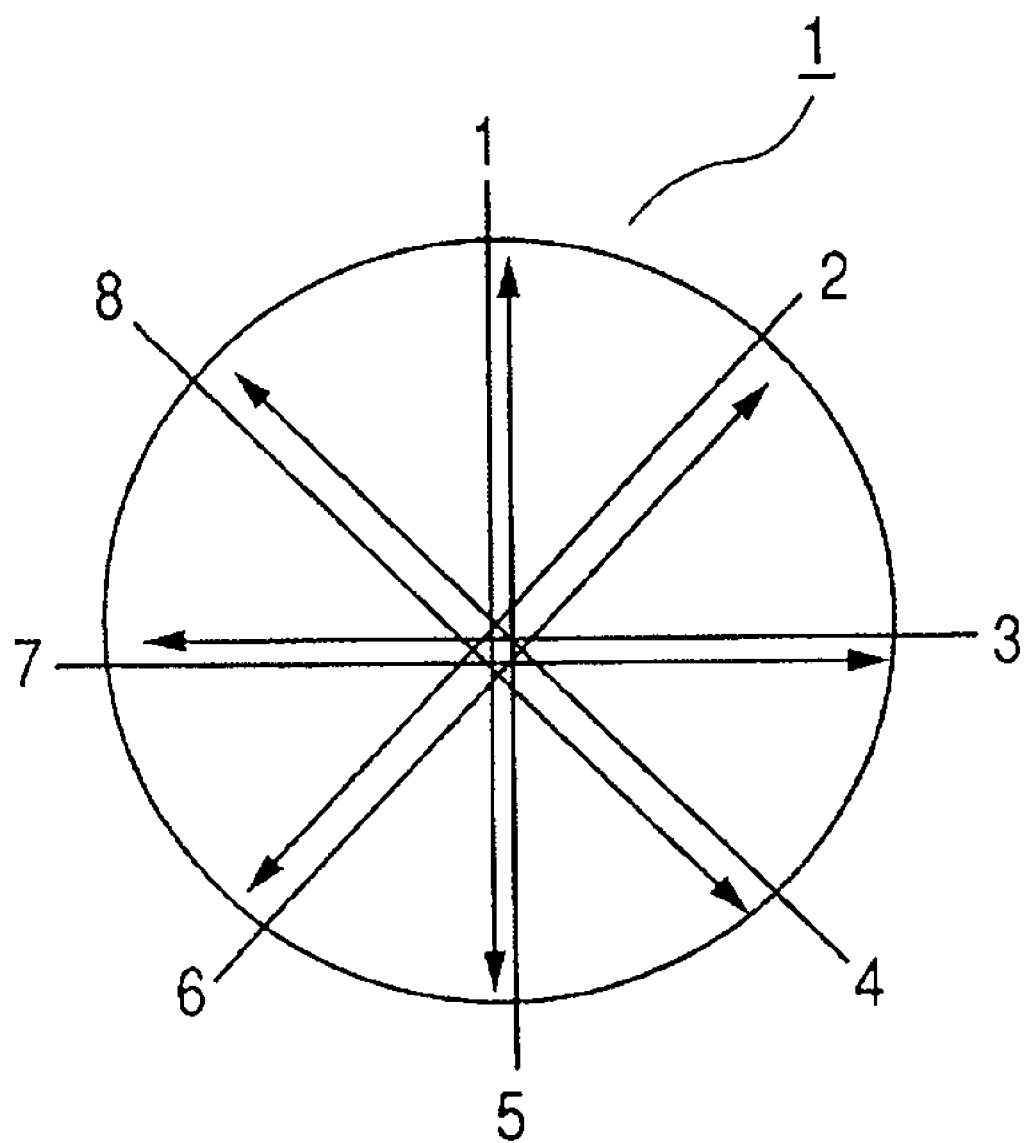
FIG. 13 is an illustration of the scanning measurement direction of an aspherical surface lens in Embodiment 1.

An actual measurement example actually measured on the basis of Embodiment 1 by the use of Form Talysurf will be shown below. Here is shown an example in which as shown in FIG. 13, measurement was effected with respect to eight directions from a direction 1 to a direction 8 while the subject lens 1 was rotated.

The decentering amount of the position of the optimum aspherical surface axis is defined as a shift amount $\Delta S$, and the tilt decentering amount of the optimum aspherical surface axis is defined as a tilt amount $\Delta T$.

Figure 14:
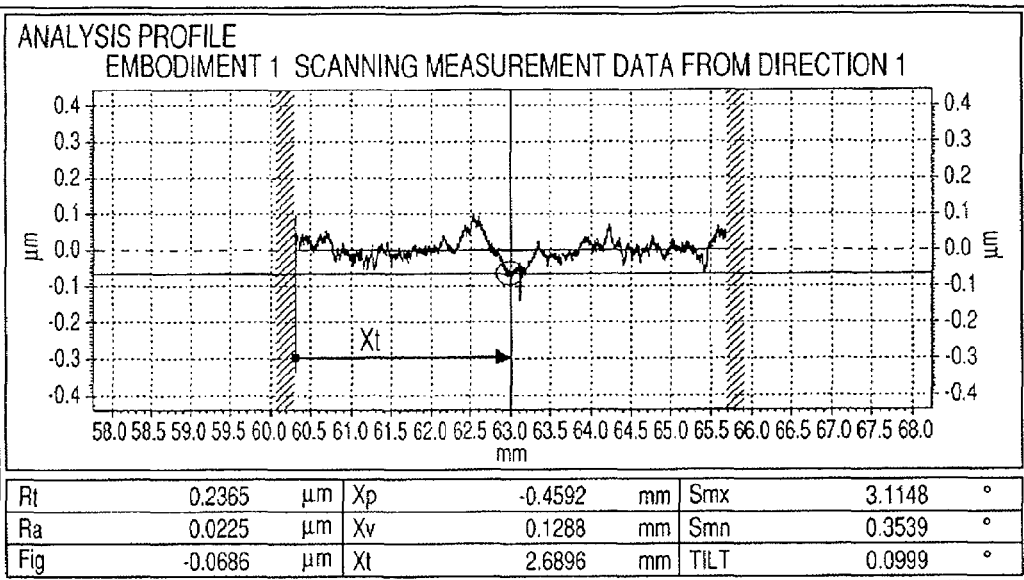
FIG. 14 shows scanning measurement data from directions 1 and 5 in Embodiment 1.
Figure 14:
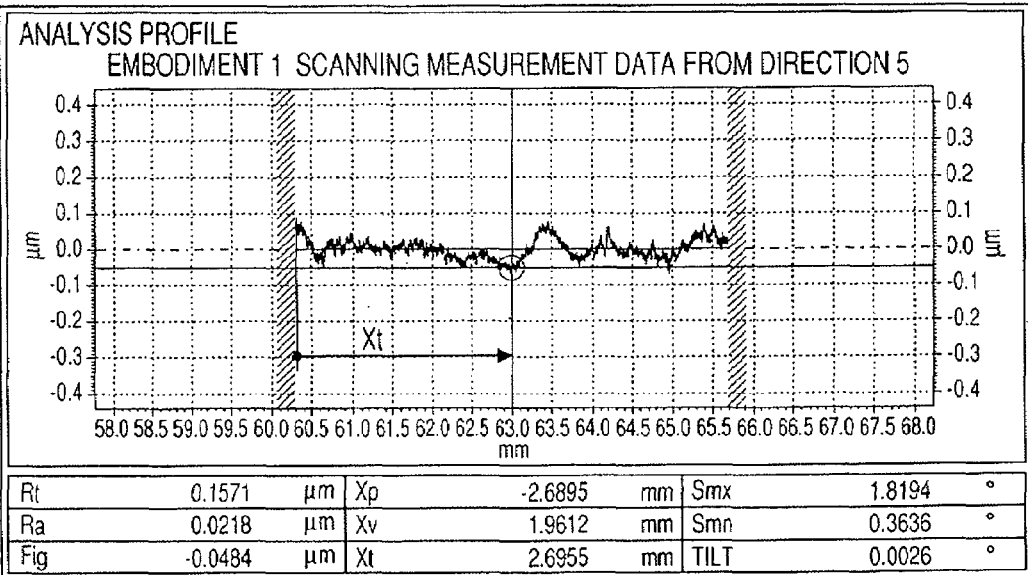

FIG. 14 shows data measured from the direction 1 and the direction 5 reversed by 180 degrees therefrom. The distance from the measurement starting point for the aspherical surface profile to the optimum aspherical surface axis is calculated as Xt.

Also, the inclination amount of the optimum aspherical surface axis is calculated as tilt. When of the measurement data from the direction 1 and the direction 5, the shift amounts are 1Xt and 5Xt and the tilt amounts are 1 tilt and 5 tilts, the shift amount of the optimum aspherical surface axis is $$\Delta S15 = (1Xt - 5Xt)/2$$
$$= (2.6896 - 2.6955)/2$$
$$= -0.003 \text{ mm, and}$$

the tilt amount of the optimum-aspherical surface axis is $$\Delta T15 = (1\ \text{tilt} - 5\ \text{tilts})/2$$
$$= (0.0999 - 0.0026)/2$$
$$= 0.049\ deg.$$

Figure 15:
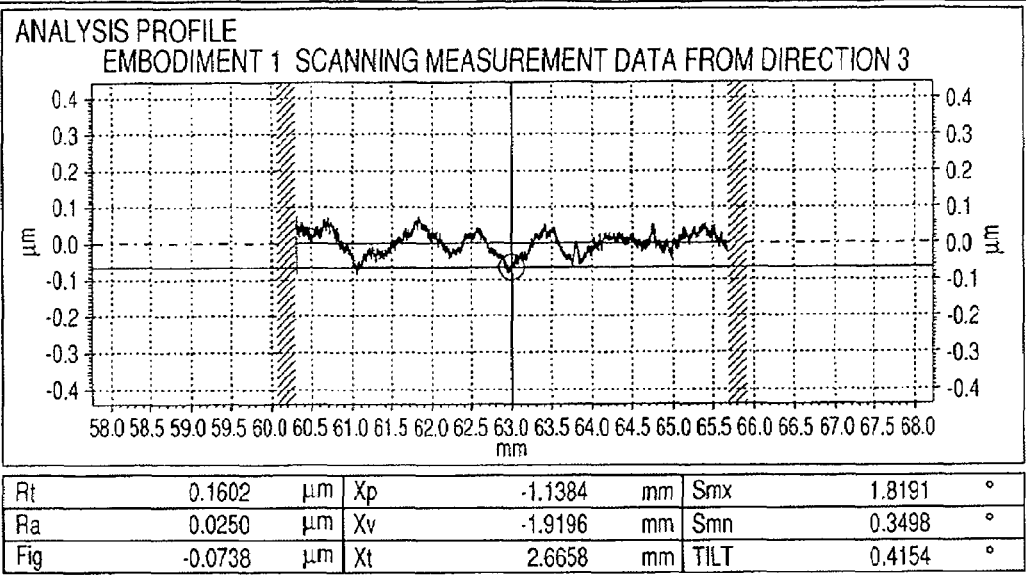
FIG. 15 shows scanning measurement data from directions 3 and 7 in Embodiment 1.
Figure 15:
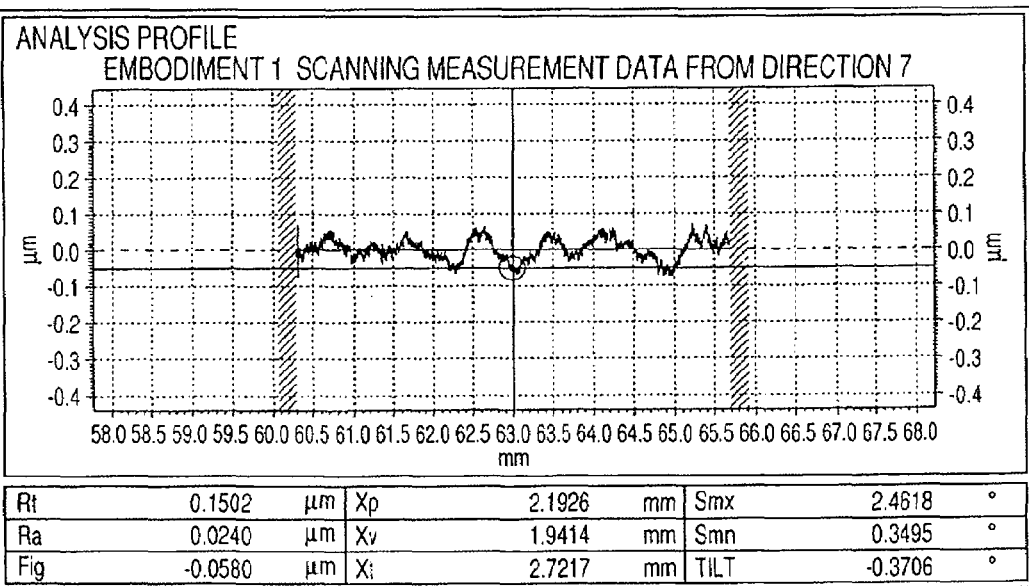

FIG. 15 shows the measurement data in the directions 3 and 7 orthogonal to the scanning measurement directions of FIG. 14.

When of the measurement data from the direction 3 and the direction 7, the shift amounts are 3Xt and 7Xt and the tilt amounts are 3 tilts and 7 tilts, the shift amount of the aspherical surface axis is $$\Delta S37 = (3Xt - 7Xt)/2$$
$$= (2.6658 - 2.7217)/2$$
$$= -0.028\ \text{mm, and}$$

the tilt amount of the aspherical surface axis is $$\Delta T37 = (3\ \text{tilt} - 7\ \text{tilts})/2$$
$$= (0.4154 - (-0.3706))/2$$
$$= 0.393\ \text{deg}.$$

The direction and amount of the decentering of the subject lens 1 can be calculated from the shift amounts ΔS15 and ΔS37 and the tilt amounts ΔT15 and ΔT37 in the directions 1 and 5 and the directions 3 and 7, respectively.

The calculated shift amount ΔS1537 from two orthogonal directions 1-5 and 3-7 is $$\Delta S1537 = \sqrt{((-0.003)^2 + (0.028)^2)} \quad (1)$$
$$= 0.028\ \text{mm}.$$

The tilt amount ΔT1537 in the directions 1 and 5 and the directions 3 and 7 is $$\Delta T1537 = \text{Tan}^{-1}\left(\sqrt{((\text{Tan}0.049)^2 + (\text{Tan}0.393)^2)}\right) \quad (2)$$
$$= 0.369\ \text{deg}.$$

Figure 18A:
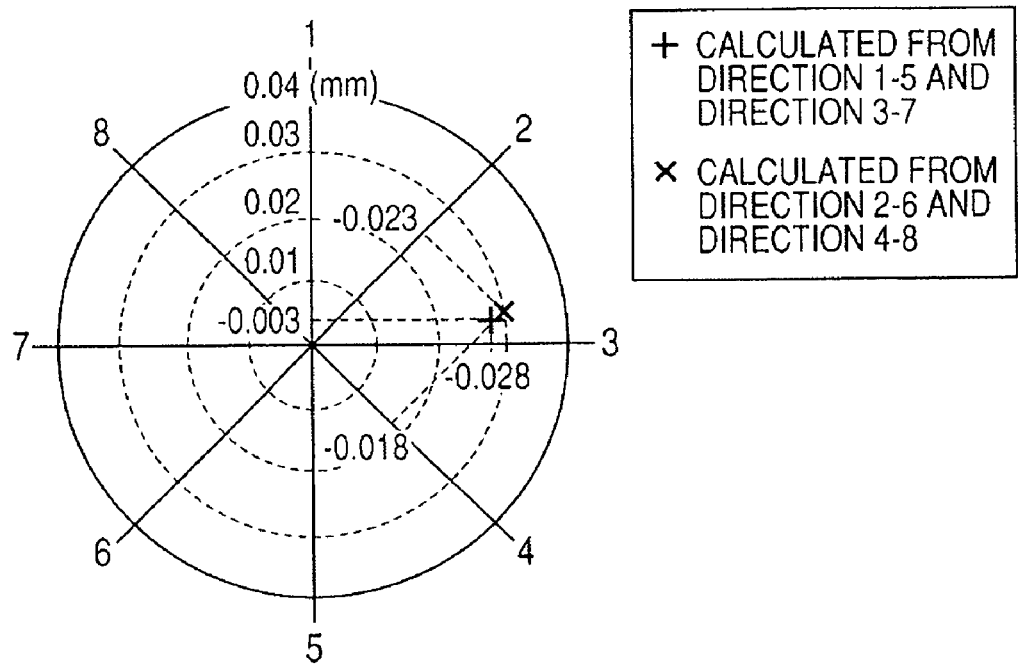
FIG. 18A is an illustration of the result of the measurement of the shift amount of an aspherical surface axis in Embodiment 1.
Figure 18B:
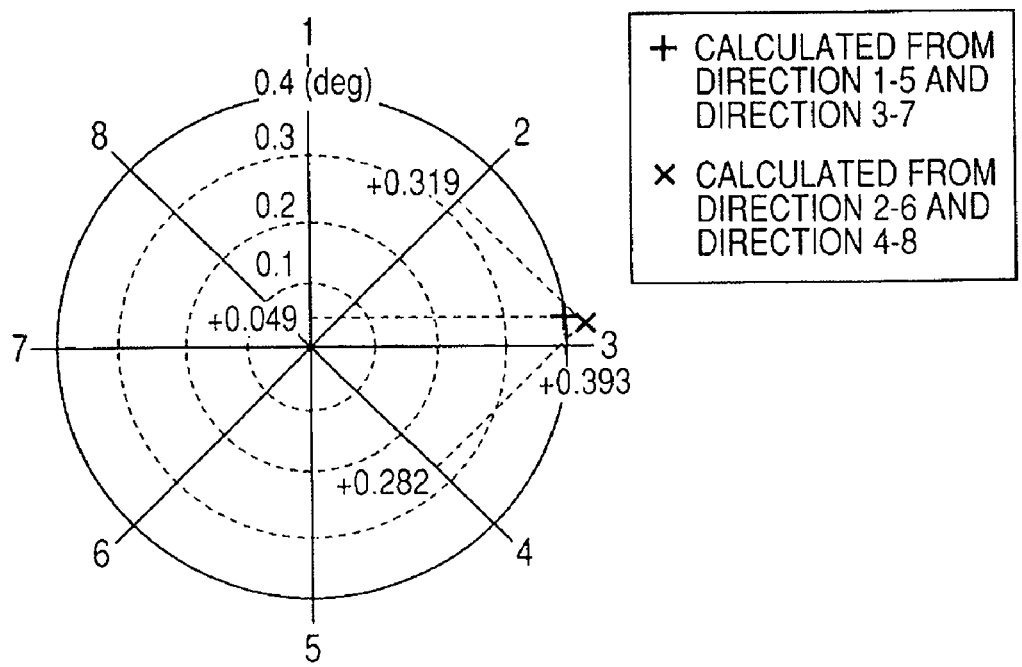
FIG. 18B is an illustration of the result of the measurement of the tilt amount of the aspherical surface axis in Embodiment 1.

The results of the measurement of the shift amount ΔS1537 and the tilt amount ΔT1537 in the directions 1 and 5 and the directions 3 and 7, respectively, are indicated by a mark + in FIGS. 18A and 18B.

Figure 16:
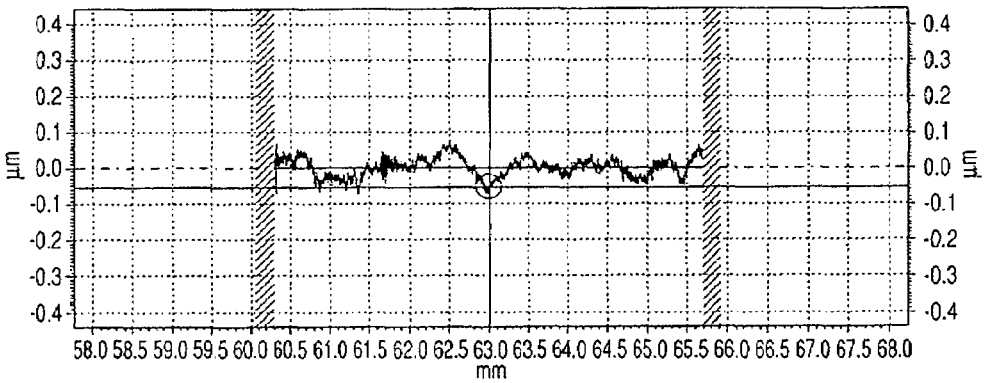
FIG. 16 shows scanning measurement data from directions 2 and 6 in Embodiment 1.
Figure 16:
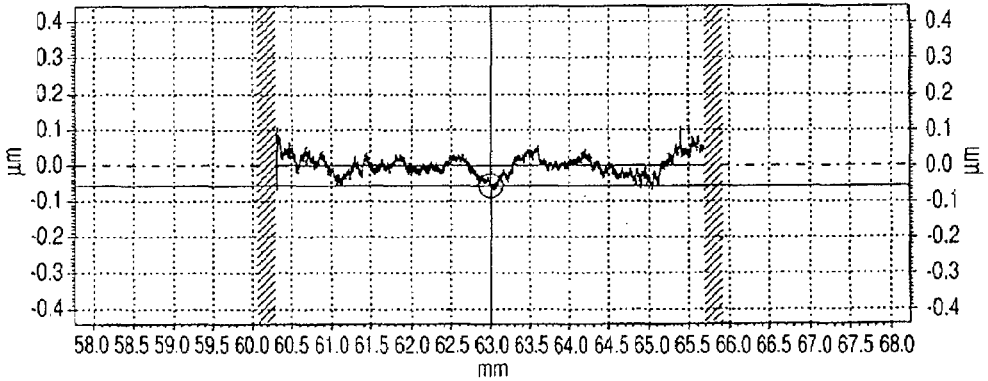
Figure 17:
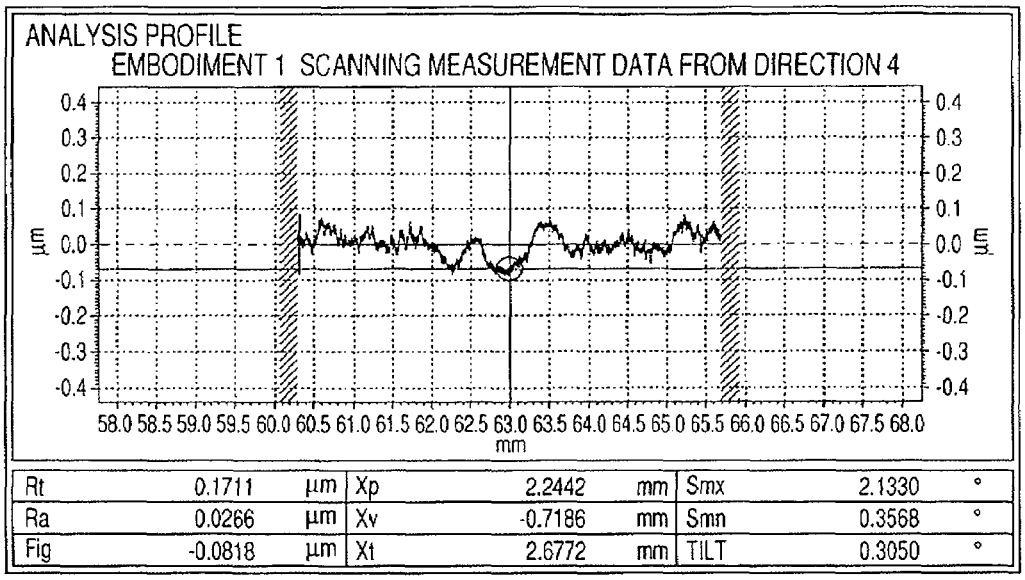
FIG. 17 shows scanning measurement data from directions 4 and 8 in Embodiment 1.
Figure 17:
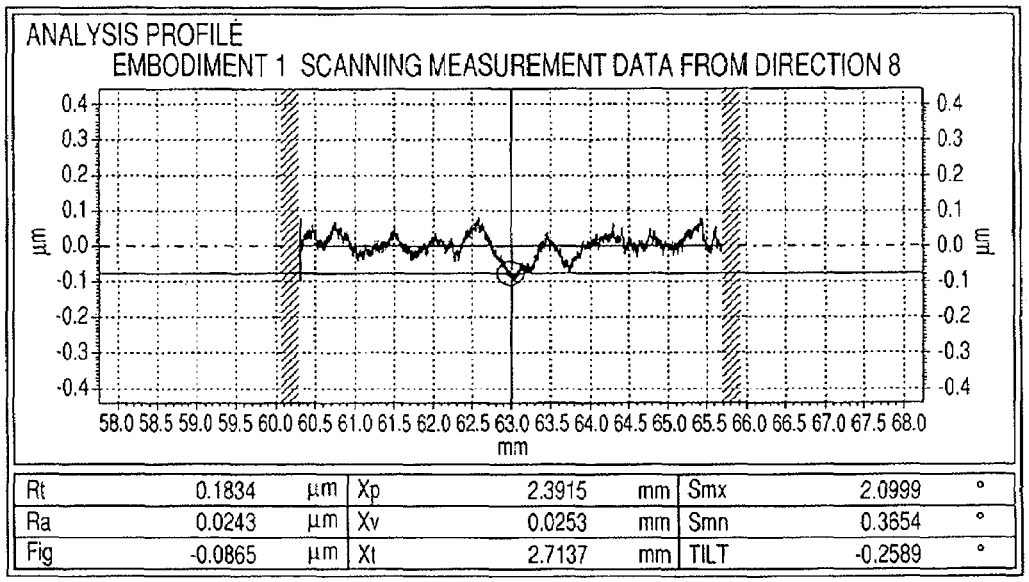

FIGS. 16 and 17 show examples in which in order to ascertain the reliability of this measuring method, measurement was likewise effected with respect to the two orthogonal directions 2 and 6 and directions 4 and 8.

When of the measurement data from the direction 2 and the direction 6, the shift amounts are 2Xt and 6Xt and the tilt amounts are 2 tilts and 6 tilts, the shift amount of the aspherical surface axis is $$\Delta S26 = (2Xt - 6Xt)/2$$
$$= (2.6713 - 2.7178)/2$$
$$= -0.023\ \text{mm, and}$$

the tilt amount of the aspherical surface axis is $$\Delta T26 = (2\ \text{tilts} - 6\text{tilts})/2$$
$$= (0.3451 - (-0.2924))/2$$
$$= 0.319\ \text{deg}.$$

When of the measurement data from the direction 4 and the direction 8, the shift amounts are 4Xt and 8Xt and the tilt amounts are 4 tilts and 8 tilts, the shift amount of the aspherical surface axis is $$\Delta S48 = (4Xt - 8Xt)/2$$
$$= (2.6772 - 2.7137)/2$$
$$= -0.018\ \text{mm, and}$$

the tilt amount of the aspherical surface axis is $$\Delta T15 = (4\ \text{tilt} - 8\ \text{tilts})/2$$
$$= (0.3050 - (0.2589))/2$$
$$= 0.282\ \text{deg}.$$

The shift amount ΔS2648 calculated from two orthogonal directions 2 and 6 and directions 4 and 8 is $$\Delta S2648 = \sqrt{((-0.023)^2 + (-0.018)^2)} \quad (3)$$
$$= 0.029\ \text{mm}.$$

The tilt amount ΔT2648 in the directions 2 and 6 and the directions 4 and 8 is $$\Delta T2648 = \text{Tan}^{-1}\left(\sqrt{((\text{Tan}0.319)^2 + (\text{Tan}0.282)^2)}\right) \quad (4)$$
$$= 0.426\ deg.$$

The results of the measurement of the shift amount ΔS2648 and the tilt amount ΔT2648 in the direction 2-6 and the direction 4-8 are indicated by a mark × in FIGS. 18A and 18B.

The difference between the result derived from the directions 1 and 5 and the directions 3 and 7 and the result derived from the directions 2 and 6 and the directions 4 and 8 can be regarded as a measurement error.

Both of the measurement results indicated by the mark + and the mark × in FIGS. 18A and 18B are indicative of substantially the same decentering amounts and directions, and show that the decentering amount of the aspherical surface axis is measurable by only the measurement in two orthogonal directions.

While Embodiment is an example in which profile measurement is performed by the use of Form Talysurf, the two-dimensional profile measuring apparatus is not restricted to Form Talysurf of a contact measuring type. It will suffice if the measuring apparatus can scan and measure an aspherical profile and has the function of searching for and calculating the position and inclination of the optimum aspherical surface axis by a calculation. Also, a similar effect will be obtained by repetitively measuring a two-dimensional aspherical profile by the use of a measuring apparatus having a three-dimensional measuring function.

When the two surfaces of the subject lens are of an aspherical profile, it is possible to measure a first surface which is the front surface by the above-described method at first, and thereafter reverse the lens and likewise measure a second surface which is the back surface. It is possible to calculate the relative decentering amount of the aspherical surface axis from the decentering amount of the aspherical surface axis on the front surface wide and the decentering amount of the aspherical surface axis on the back surface side.

Figure 6:
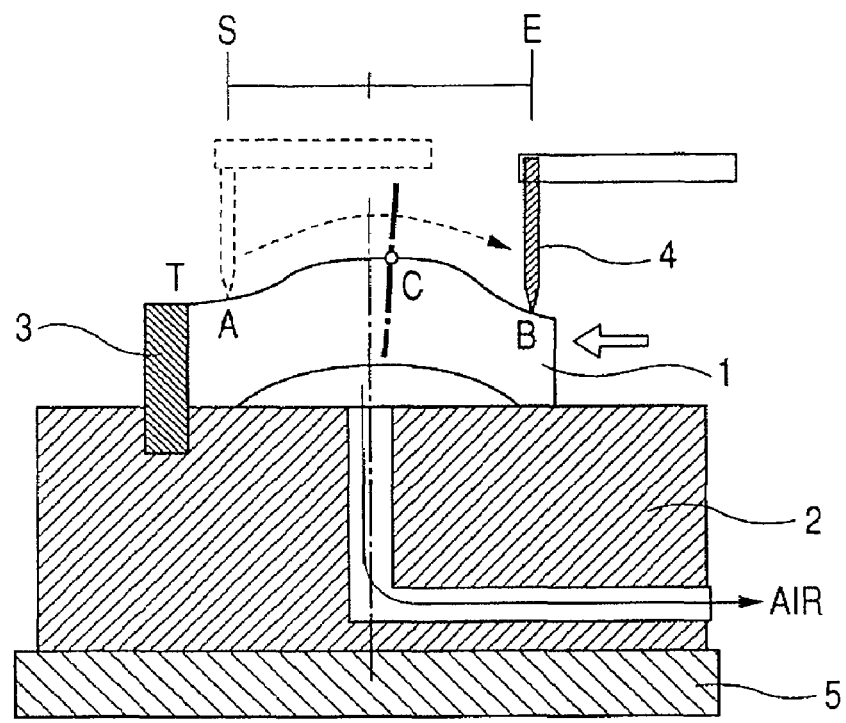
FIG. 6 is a cross-sectional view of the lens holding member when in Embodiment 1, a subject lens surface is a concave surface.
Figure 7:
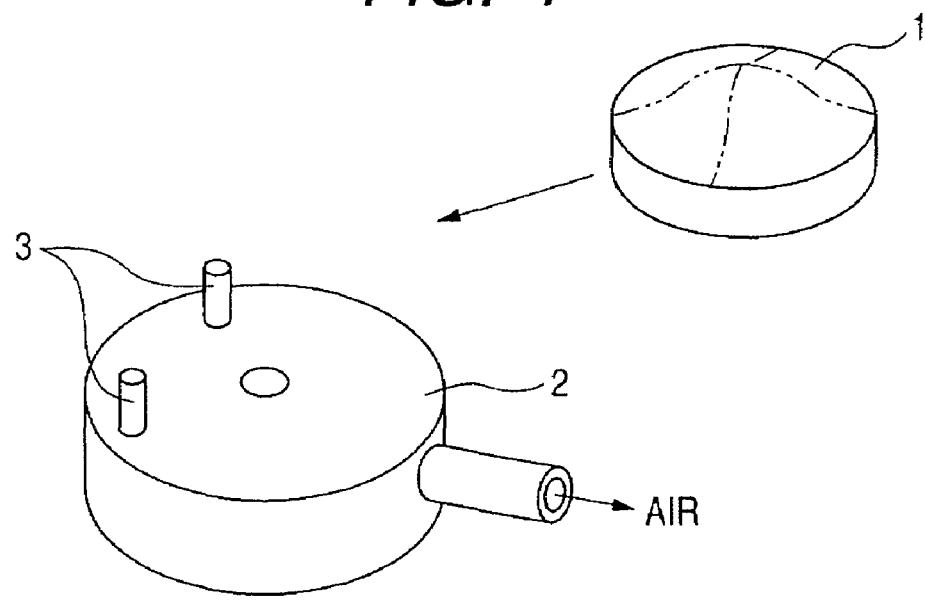
FIG. 7 is a perspective view of the lens holding member when in Embodiment 1, the subject lens surface is a concave surface.

Also, in a case the receiving surface side of the subject lens for the positioning in the direction of the optical axis is a concave surface, the lens receiving jig 2 in the direction of the optical axis can be made into a flat shape, as shown in FIG. 6. It is also possible to make the positioning jig 3 for the positioning in a direction perpendicular to the optical axis into such two positioning pins as shown in FIG. 7.

Embodiment 2

Embodiment 2 of the present invention will now be described.

There is a case where it is desired to measure the decentering state of the aspherical surface axis of a subject lens of which the outer diameter portion is not subjected to centering processing. The subject lens before the centering processing is unstable in the dimensions of the outer diameter portion of the lens and therefore, cannot be subjected to such measurement as in Embodiment 1 with the outer diameter of the lens as the reference. Embodiment 2 is an embodiment for obtaining the decentering information of the subject lens before the centering processing.

Figure 8:
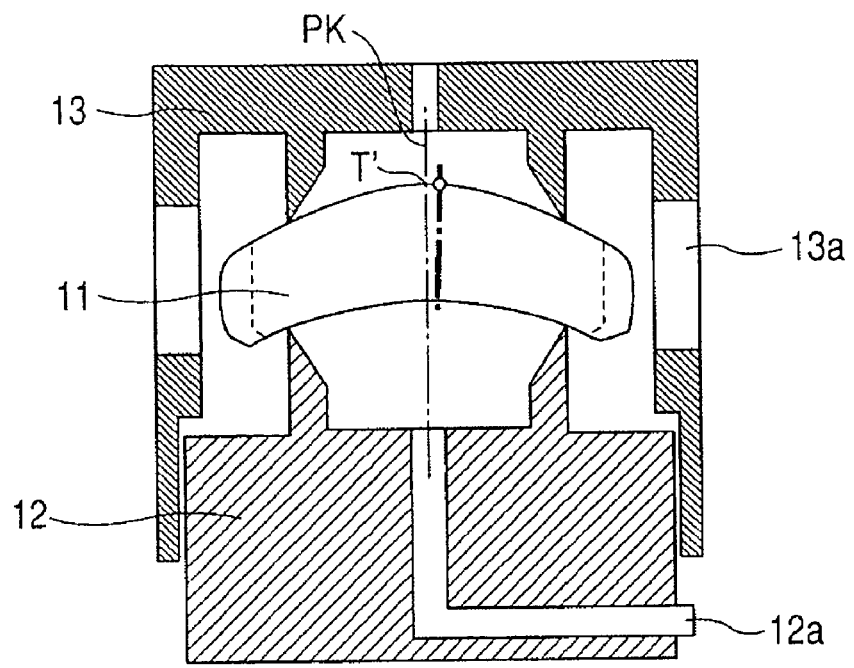
FIG. 8 is a cross-sectional view showing lens centering holding state in the first measurement in Embodiment 2.
Figure 9:
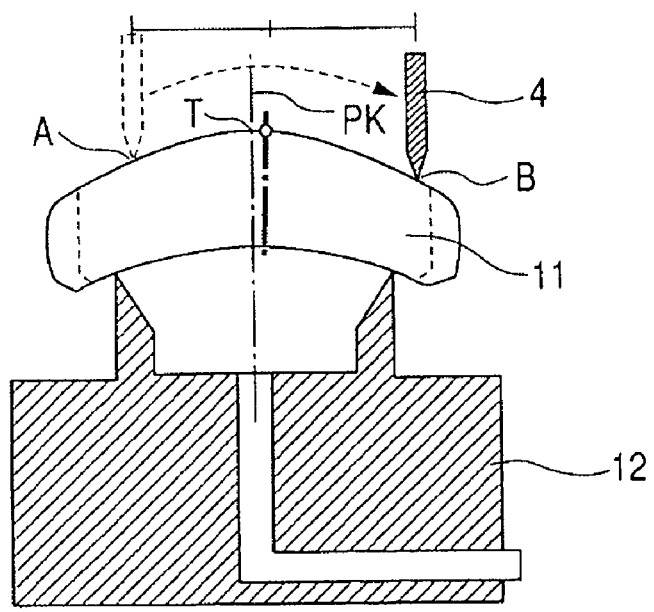
FIG. 9 is an illustration of a measuring state after the lens centering in the first measurement in Embodiment 2.
Figure 10:
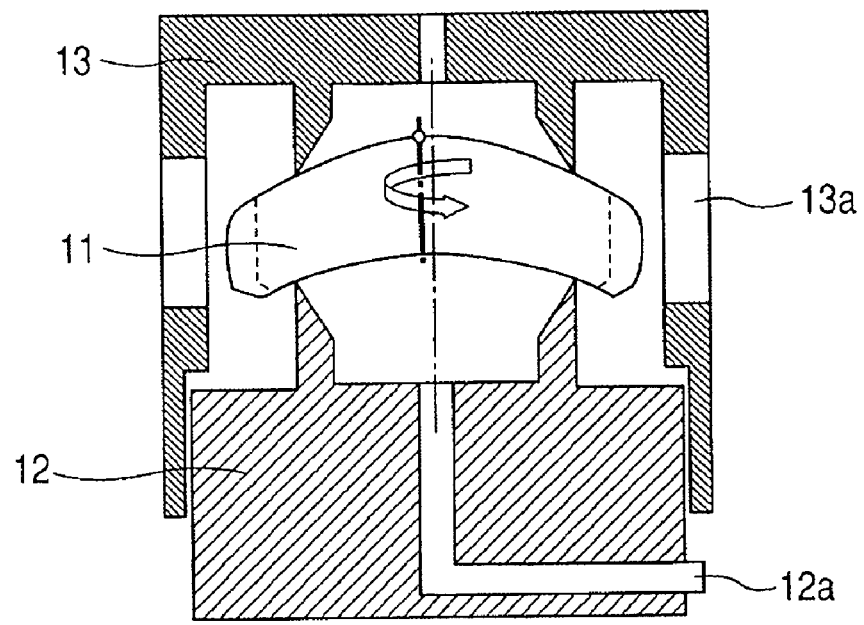
FIG. 10 is a cross-sectional view showing the lens centering holding state in the second measurement in Embodiment 2.
Figure 11:
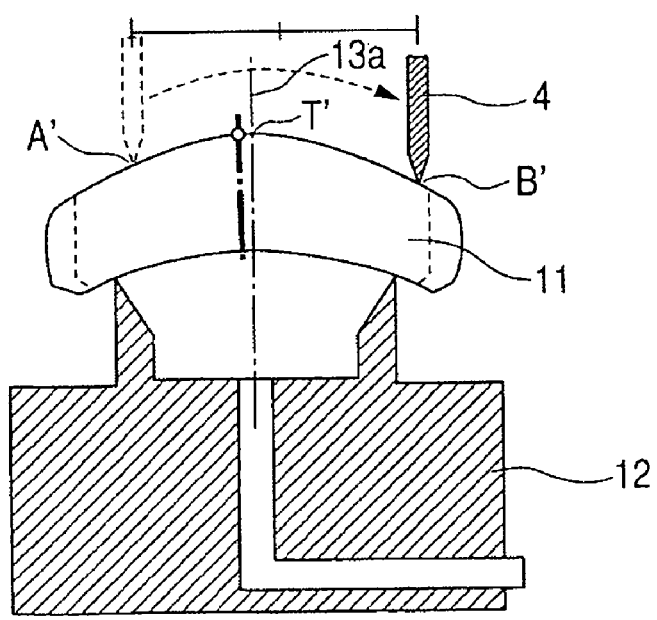
FIG. 11 is an illustration of a measuring state after the lens centering in the second measurement in Embodiment 2.

In Embodiment 2, as shown in FIGS. 8 and 10, the subject lens 11 is fixed and held with the positions thereof in the direction of the optical axis and a direction perpendicular to the optical axis determined by a bell clamp method. FIG. 9 shows the state of the first measurement. FIG. 11 shows the state of the second measurement.

Figure 12:
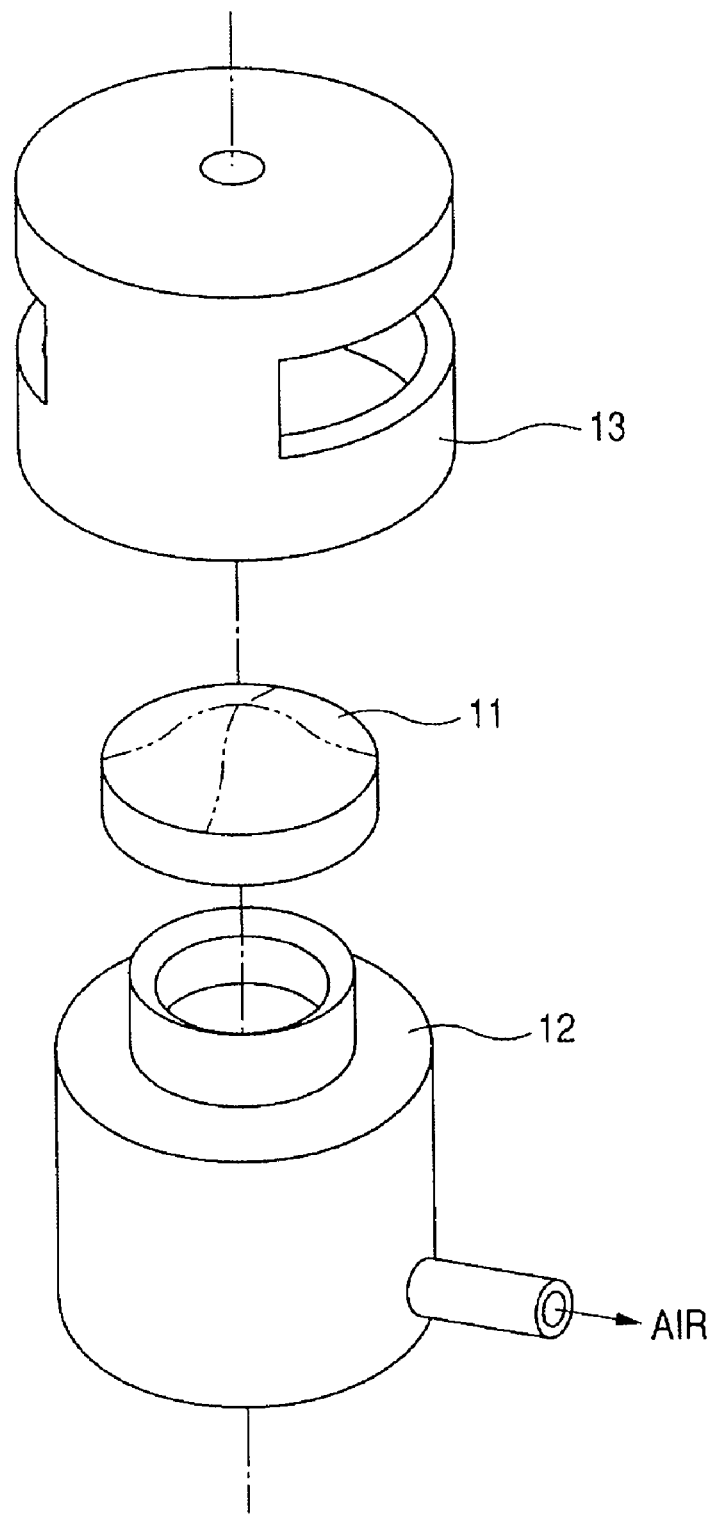
FIG. 12 is a perspective view of a lens holding member in Embodiment 2.

FIG. 12 is a perspective view of Embodiment 2.

Description will hereinafter be made of a method of positioning the subject lens 11 according to the present embodiment.

First, the subject lens 11 is placed on a fixed first cylindrical lens holding member 12. Next, a movable second cylindrical lens holding member machined so as to be coaxial with the lens holding member 12 is fitted to the lens holding member 12. At this time, the subject lens 11 is sandwiched by and between the lens holding member 12 and the lens holding member 13, and the centering of the subject lens 11 is effected by the bell clamp method. The bell clamp method is a method of sandwiching a lens by and between two cylinders (bells) having the same central axis to thereby bring the central axes of the cylinders and the optical axis of the lens into coincidence, and effect the centering of the lens. In a state in which the two surfaces of the lens are in close contact with the two cylinders, the lens thickness of the portion of the lens at which the cylinders contact become equal over the entire periphery of the lens surface, and as the result, the optical axis of the lens coincides with the rotation axes of the cylinders.

If at this time, the air is fed into through-holes 12a and 13a in the lens holding members 12 and 13, respectively, the frictional resistance of the contact portion between the subject lens 11 and the lens holding member 12 is reduced, and more highly accurate centering will become possible.

In a state in which the centering has been done as shown in FIG. 8, the air in the through-hole 12a in the lens holding member 12 is evacuated, and the subject lens 11 is sucked and fixed to the lens holding member 2. Then, as shown in FIG. 9, the lens holding member 13 is retracted.

In FIGS. 8 and 9, PK designates the central axis (predetermined position) of the bell clamp. The distance (predetermined amount) TA or T'A' from the central axis PK to a point A or a point A' corresponds to the predetermined amount TA or TA' in FIG. 1 or 2.

Thereafter, as in Embodiment 1, the aspherical surface profile is measured within the same measurement range in the aspherical surface profile guarantee range by the use of the probe 4.

When the first measurement is completed, the subject lens 11 is reversed by 180 degrees relative to the optical axis, and as shown in FIG. 10, the centering of the subject lens 11 is effected again. Thereafter, the second measurement of the aspherical surface profile is effected as shown in FIG. 11.

From the first and second aspherical surface profile measurement data, the decentering amount of the aspherical surface lens is obtained as in Embodiment 1.

In the case of Embodiment 2, even if the outer diameter portion of the subject lens is in the state before the centering processing, it is possible to obtain the decentering amount of the aspherical surface axis relative to the reference of the outer diameter portion of the lens as if subjected to the centering processing by the bell clamp method.

In a job site wherein the machining of an aspherical lens is actually effected, it is a great merit that the amount of the decentering of the aspherical surface lens can be measured before the centering processing.

Also, in an aspherical lens after the centering process, if the method of the present embodiment is used, it becomes possible to analyze whether the aspherical surface axes of the two surfaces of the aspherical lens are decentering relative to each other, or whether the lens is decentered relative to the outer diameter of the lens due to a centering processing error.

According to each embodiment, the decentering amount of the aspherical surface axis of the subject lens relative to the outer diameter thereof can be highly accurately measured by the use of a simple jig for effecting the positioning of the subject lens in the direction of the optical axis thereof and a direction perpendicular to the optical axis, and a two-dimensional profile measuring apparatus for measuring an aspherical surface cross-sectional shape.

Also, according to Embodiment 2, again in the subject lens before the centering processing, the decentering amount of the aspherical surface axis relative to an estimated outer diameter which will be extraneously centering-processed can be highly accurately measured by the bell clamp method.

This application claims priority from Japanese Patent Application No. 2005-079725 filed Mar. 18, 2005, which is hereby incorporated by reference herein.

What is claimed is:

1. A method of measuring the decentering of a lens, comprising the steps of:

a first step of measuring a profile of an examined surface of the lens by moving a probe along the examined surface, starting from a first reference position which is a position separated by a predetermined amount from a predetermined position on the examined surface of the lens;

a second step of measuring the profile of the examined surface of the lens by moving the probe along the examined surface, starting from a second reference position which is a position-separated by a predetermined amount from the predetermined position, and moving in a direction opposite to the scanning direction of the first step after a rotation of the lens;

a step of calculating the decentering amount of the examined surface of the lens by using the measurements obtained in the first and second steps; and a step of indicating the calculated decentering amount of the examined surface of the lens, wherein the probe is in direct, physical contact with the lens during the first and second steps.

2. A method according to claim 1, wherein the profile of said examined surface measured in said first and second steps is a profile in the same cross section.

3. A method according to claim 2, wherein said first and second steps are executed in each of a plurality of different cross sections, and the decentering amount of said examined surface is obtained by the use of the result of measurement in said plurality of cross sections.

4. A method according to claim 2, wherein said first and second steps are executed in each of two cross sections orthogonal to each other, and the decentering amount of said examined surface is obtained by the use of the result of measurement in said two cross sections orthogonal to each other.

5. A method according to claim 1, further comprising:
the step of determining the predetermined position corresponding to the outer peripheral portion of said subject lens by a jig.

6. A method according to claim 1, further comprising:
the step of sandwiching said subject lens by and between two holding members having a cylindrical cross section, and bringing the axis of said subject lens and the central axes of said two holding members into coincidence with each other, and wherein said first and second steps are executed in a state in which the axis of said subject lens is coincident with the central axes of said holding members, and said predetermined position is a position corresponding to the central axes of said holding members.

* * * * *